United States Patent
Byom et al.

(10) Patent No.: US 11,972,143 B2
(45) Date of Patent: Apr. 30, 2024

(54) TECHNIQUES FOR BALANCING WRITE COMMANDS ON SOLID STATE STORAGE DEVICES (SSDs)

(71) Applicant: Apple Inc., Cupertino, CA (US)

(72) Inventors: Matthew J. Byom, San Jose, CA (US); Tudor Antoniu, Woodland, CA (US); Alexander Paley, San Jose, CA (US); Andrew W. Vogan, Austin, TX (US); Muhammad N. Ashraf, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/222,978

(22) Filed: Apr. 5, 2021

(65) Prior Publication Data
US 2022/0326877 A1    Oct. 13, 2022

(51) Int. Cl.
*G06F 3/06*    (2006.01)
*G06F 12/0875*    (2016.01)

(52) U.S. Cl.
CPC ............ *G06F 3/0659* (2013.01); *G06F 3/061* (2013.01); *G06F 3/0644* (2013.01); *G06F 3/0679* (2013.01); *G06F 12/0875* (2013.01); *G06F 2212/1016* (2013.01)

(58) Field of Classification Search
USPC ....................................................... 711/103
See application file for complete search history.

(56) References Cited

U.S. PATENT DOCUMENTS

| | | | |
|---|---|---|---|
| 10,452,301 B1* | 10/2019 | Farhan ................. | G06F 3/0656 |
| 2009/0210464 A1* | 8/2009 | Chiang-Lin ........... | G06F 12/023 |
| 2016/0364337 A1* | 12/2016 | Hale ................... | G06F 12/0897 |
| 2018/0081543 A1* | 3/2018 | Muchherla ........... | G06F 3/0604 |
| 2019/0034330 A1* | 1/2019 | Natarajan ............ | G11C 29/021 |
| 2020/0073795 A1* | 3/2020 | Asano .................. | G06F 3/0656 |
| 2021/0081115 A1* | 3/2021 | Clarke ................. | G06F 3/0659 |
| 2021/0249071 A1* | 8/2021 | Tanpairoj ............ | G06F 13/1642 |

FOREIGN PATENT DOCUMENTS

JP    2010198407 A    *    9/2010

* cited by examiner

*Primary Examiner* — Yaima Rigol
*Assistant Examiner* — Elias Young Kim
(74) *Attorney, Agent, or Firm* — DICKINSON WRIGHT RLLP

(57) ABSTRACT

Disclosed herein are techniques for balancing write commands directed to a non-volatile memory. According to some embodiments, a method may include caching a plurality of write commands into a write cache, and, in response to determining that an available capacity of the write cache satisfies a first threshold value: performing at least one write operation by directing data associated with the write commands in the write cache to the first partition of the non-volatile memory in response to determining that an available capacity of a first partition of the non-volatile memory satisfies a second threshold value; and performing at least one write operation by directing data associated with the write commands in the write cache to a second partition of the non-volatile memory in response to determining that the available capacity of the first partition of the non-volatile memory does not satisfy the second threshold value.

20 Claims, 13 Drawing Sheets

SLC Overheat Ratio Table

| SLC / TLC P/E Difference % | TLC % / SLC % |
|---|---|
| 1-19 | 12 / 88 |
| 20-39 | 33 / 67 |
| 40-59 | 47 / 53 |
| 60-79 | 60 / 40 |
| 80-99 | 75 / 25 |
| 100-119 | 86 / 14 |
| 120-139 | 93 / 7 |
| 140-159 | 95 / 5 |
| 160-179 | 97 / 3 |
| 180-199 | 98 / 2 |
| 200 and more | 100 / 0 |

*FIG. 4*

TECHNIQUES FOR BALANCING WRITE COMMANDS ON SOLID STATE STORAGE DEVICES (SSDs)

FIELD

The described embodiments set forth techniques for improving endurance performance balancing on a non-volatile memory (e.g., a solid-state drive (SSD)). In particular, the techniques described herein may enable write command performance to be balanced between single-level cell and multi-level cell non-volatile memory.

BACKGROUND

Solid state drives (SSDs) are a type of storage device that share a similar physical footprint with (and provide similar functionality as) traditional magnetic-based hard disk drives (HDDs). Notably, standard SSDs, which utilize non-volatile memory, such as "flash" memory, may provide various advantages over standard HDDs, such as considerably faster Input/Output (I/O) performance. For example, average I/O latency speeds provided by SSDs typically outperform those of HDDs because the I/O latency speeds of SSDs are less affected when data is fragmented across the memory sectors of SSDs. This occurs because HDDs include a read head component that must be relocated each time data is read or written, which produces a latency bottleneck as the average contiguity of written data is reduced over time. Moreover, when fragmentation occurs within HDDs, it becomes necessary to perform resource-intensive defragmentation operations to improve or restore performance.

In contrast, SSDs, which are not bridled by read head components, may preserve I/O performance even as data fragmentation levels increase. SSDs typically also provide the benefit of increased impact tolerance (as there are no moving parts), and, in general, virtually limitless form factor potential. These advantages, combined with the increased availability of SSDs at consumer-affordable prices, make SSDs a preferable choice for mobile devices such as laptops, tablets, and smart phones.

Typically, the non-volatile memory of an SSD is expected retain data for a minimum period during its operational life. Such non-volatile memory may be organized into single-level cells (SLC), multi-level cells (MLC) (e.g., triple-level cells, and the like), or a combination thereof. However, the endurance performance—e.g., a number of times data may be written or erased from memory cells before the memory cells may no longer reliably retain data and/or become unreadable—of SLCs may vary substantially in comparison to the endurance performance of MLCs. For example, an endurance performance for an SLC may be 100,000 cycles, whereas an endurance performance for an MLC may be 3,000 cycles. Accordingly, in SSDs that use a multi-partition arrangement (e.g., using both single-level cells and multi-level cells and/or combinations of various types of multi-level cells), the partitions having a lower endurance performance may become unreliable or unreadable before the partitions having a higher endurance performance, thereby rendering the SSD at least partially inoperable.

SUMMARY

The described embodiments set forth techniques for improving endurance performance balancing on a non-volatile memory (e.g., a solid-state drive (SSD)). In particular, the techniques described herein may enable write command performance to be balanced between single-level cell and multi-level cell non-volatile memory.

An embodiment sets forth a technique for balancing write commands in a non-volatile memory. According to some embodiments, a method may include caching a plurality of write commands into a write cache. The method may also include, in response to determining that an available capacity of the write cache satisfies a first threshold value: performing at least one write operation by directing data associated with the write commands in the write cache to the first partition of the non-volatile memory in response to determining that an available capacity of a first partition of the non-volatile memory satisfies a second threshold value; and performing at least one write operation by directing data associated with the write commands in the write cache to a second partition of the non-volatile memory in response to determining that the available capacity of the first partition of the non-volatile memory does not satisfy the second threshold value.

Another embodiment sets forth a technique for providing improved boot times of a computing device. According to some embodiments, a method may include, during performance of a replay operation: reading, by a host controller of the computing device, namespace mapping data stored in a first persistent memory partition of the computing device; and reading namespace data stored in a storage device of the computing device using the namespace mapping data. The method may also include, after performance of the replay operation: determining whether indirection data stored in a second persistent memory partition of computing device is synchronized with the namespace mapping data; in response to a determination that the indirection data is not synchronized with the namespace mapping data: traversing memory blocks corresponding to the namespace mapping data; updating the indirection data using the namespace mapping data; and reading, by the host controller, the namespace data stored in the storage device using the indirection data.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings, which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 4 illustrates a schedule of single-level cell partition/multi-level cell partition write command performance balancing ratios, according to some embodiments.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments may be practiced without some or all of these specific details. In other instances, well-known process steps have not been described in detail in order to avoid unnecessarily obscuring the presently described embodiments. Other applications are possible, such that the following examples should not be taken as limiting.

Figure 1A:
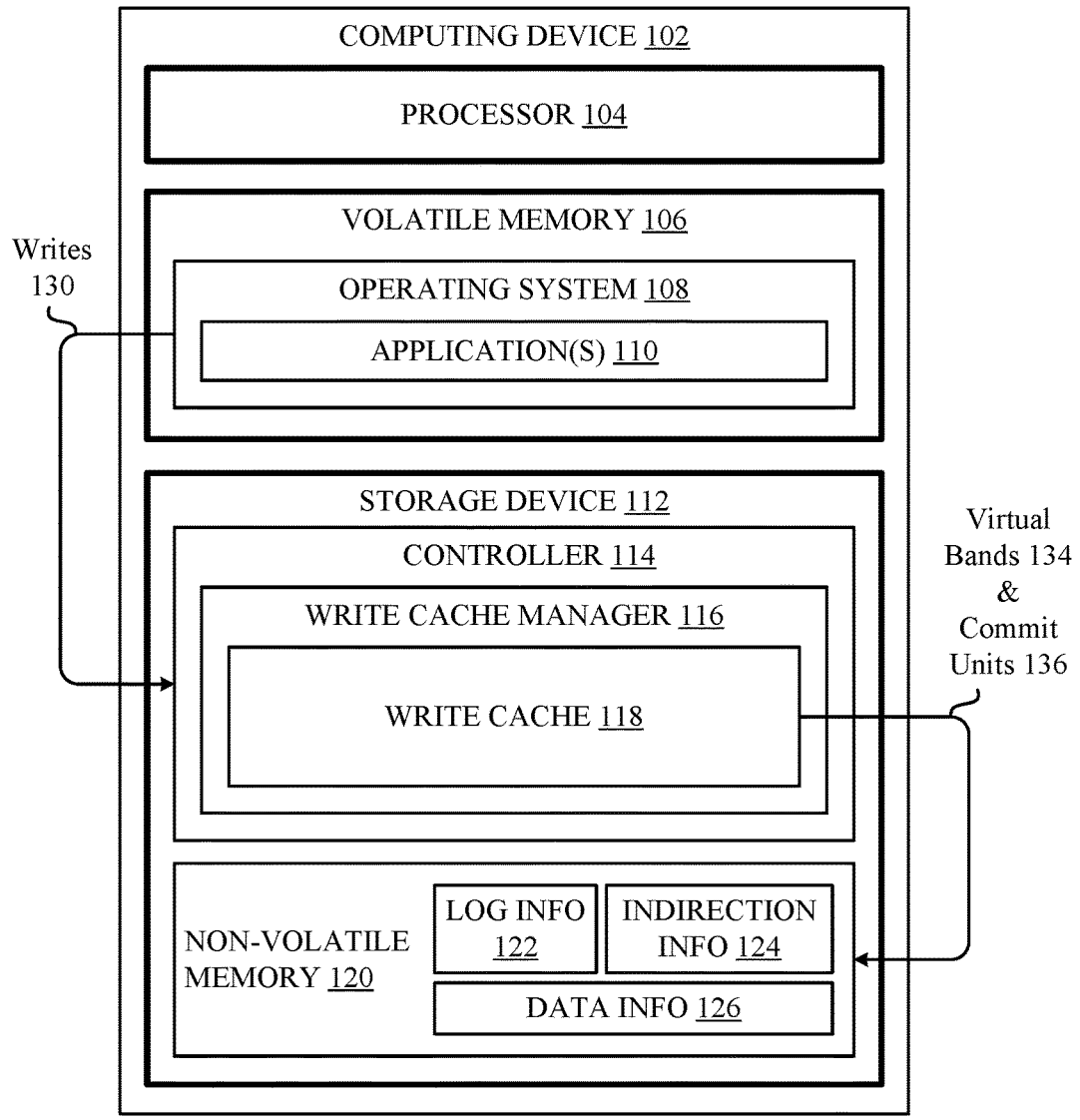
FIGS. 1A-1C illustrate conceptual diagrams of different components of a computing device that is configured to implement the various techniques described herein, according to some embodiments.

FIG. 1A illustrates a conceptual diagram 100 of a computing device 102—e.g., a smart phone, a tablet, a laptop, a desktop, a server, etc.—that may be configured to implement the various techniques described herein. As shown in FIG. 1A, the computing device 102 may include a processor 104 that, in conjunction with a volatile memory 106 (e.g., a dynamic random-access memory (DRAM)) and a storage device 112 (e.g., a solid-state drive (SSD)), enables different software entities to execute on the computing device 102. For example, the processor 104 may be configured to load, from the storage device 112 into the volatile memory 106, various components for an operating system (OS) 108. In turn, the operating system 108 may enable the computing device 102 to provide a variety of useful functions, e.g., loading/executing various applications 110 (e.g., user applications). It should be understood that the various hardware components of the computing device 102 illustrated in FIG. 1A are presented at a high level in the interest of simplification, and that a more detailed breakdown is provided below in conjunction with FIG. 9.

As shown in FIG. 1A, the operating system 108/applications 110 may issue write commands 130 to the storage device 112, e.g., new data writes, existing data overwrites, existing data migrations, and so on. According to some embodiments, and as shown in FIG. 1A, the storage device 112 may include a controller 114 that is configured to orchestrate the overall operation of the storage device 112. In particular, the controller 114 may implement a write cache manager 116 that receives various write commands 130 and stores them into a write cache 118. According to some embodiments, and as described in greater detail herein, the write cache manager 116 may transmit, to the non-volatile memory 120, the write commands 130 stored in the write cache 118. In particular, the write cache manager 116 may utilize virtual bands 134 and commit units 136 to transmit the write commands 130 to the non-volatile memory 120. A more detailed breakdown of the virtual bands 134 and commit units 136 is provided below in conjunction with FIG. 1C. It is noted that the controller 114 may include additional entities that enable the implementation of the various techniques described herein without departing from the scope of this disclosure. Is further noted that the entities described herein may be combined or split into additional entities without departing from the scope of this disclosure. It is additionally noted that the various entities described herein may be implemented using software-based or hardware-based approaches without departing from the scope of this disclosure.

According to some embodiments, and as additionally shown in FIG. 1A, the non-volatile memory 120 may include log information 122, indirection information 124 and data information 126. According to some embodiments, transactional information associated with the indirection information 124/data information 126 (e.g., details associated with I/O requests processed by the controller 114) may be written into the log information 122, such that replay operations may be performed to restore coherency when recovering from power failures. For example, the transactional information may be utilized to restore the content of the indirection information 124 when an inadvertent shutdown of the computing device 102 renders at least a partition of the content out-of-date. According to some embodiments, the content stored in the indirection information 124 may include context information that serves as a mapping table for data that is stored within the data information 126. The mapping table may indicate memory address associated with data stored within the data information 126 (e.g., including both namespace data and any other data). According to some embodiments, the context information may be transmitted between the volatile memory 106 and the non-volatile memory 120 using direct memory access (DMA) such that the processor 104 plays little or no role in the data transmissions between the volatile memory 106 and the non-volatile memory 120. It is noted, however, that any technique may be utilized to transmit data between the volatile memory 106 and the non-volatile memory 120 without departing from the scope of this disclosure.

According to some embodiments, the context information may be organized into a hierarchy that includes first and second depth levels. In particular, the first depth level may correspond to a collection of "first-tier" entries, while the second depth level may correspond to a collection of "second-tier" entries. According to some embodiments, the first and second-tier entries may store data in accordance with different encoding formats that coincide with the manner in which the non-volatile memory 120 is partitioned into different sectors. For example, when each sector represents a 4 kB sector of memory, each first-tier entry may correspond to a contiguous collection of two hundred fifty-six (256) sectors. In this regard, the value of a given first-tier entry may indicate whether the first-tier entry (1) directly refers to a physical location (e.g., an address of a starting sector) within the non-volatile memory 120, or (2) directly refers (e.g., via a pointer) to one or more second-tier entries. According to some embodiments, when condition (1) is met, it is implied that all (e.g., the two-hundred fifty-six (256)) sectors associated with the first-tier entry are contiguously written, which may provide a compression ratio of 1/256.

More specifically, this compression ratio may be achieved because the first-tier entry stores a pointer to a first sector of the two hundred fifty-six (256) sectors associated with the first-tier entry, where no second-tier entries are required. Alternatively, when condition (2) is met, information included in the first-tier entry indicates (i) one or more second-tier entries that are associated with the first-tier entry, as well as (ii) how the information in the one or more second-tier entries should be interpreted. Using this approach, each second-tier entry may refer to one or more sectors, thereby enabling data to be disparately stored across the sectors of the non-volatile memory 120.

It is noted that a more detailed breakdown of various indirection techniques that may be utilized by the embodiments set forth herein may be found in U.S. patent Application Ser. No. 14/710,495, filed May 12, 2015, entitled "METHODS AND SYSTEM FOR MAINTAINING AN INDIRECTION SYSTEM FOR A MASS STORAGE DEVICE," published as U.S. 2016/0335198A1 on Nov. 17, 2016, the content of which is incorporated by reference herein in its entirety.

Figure 1B:
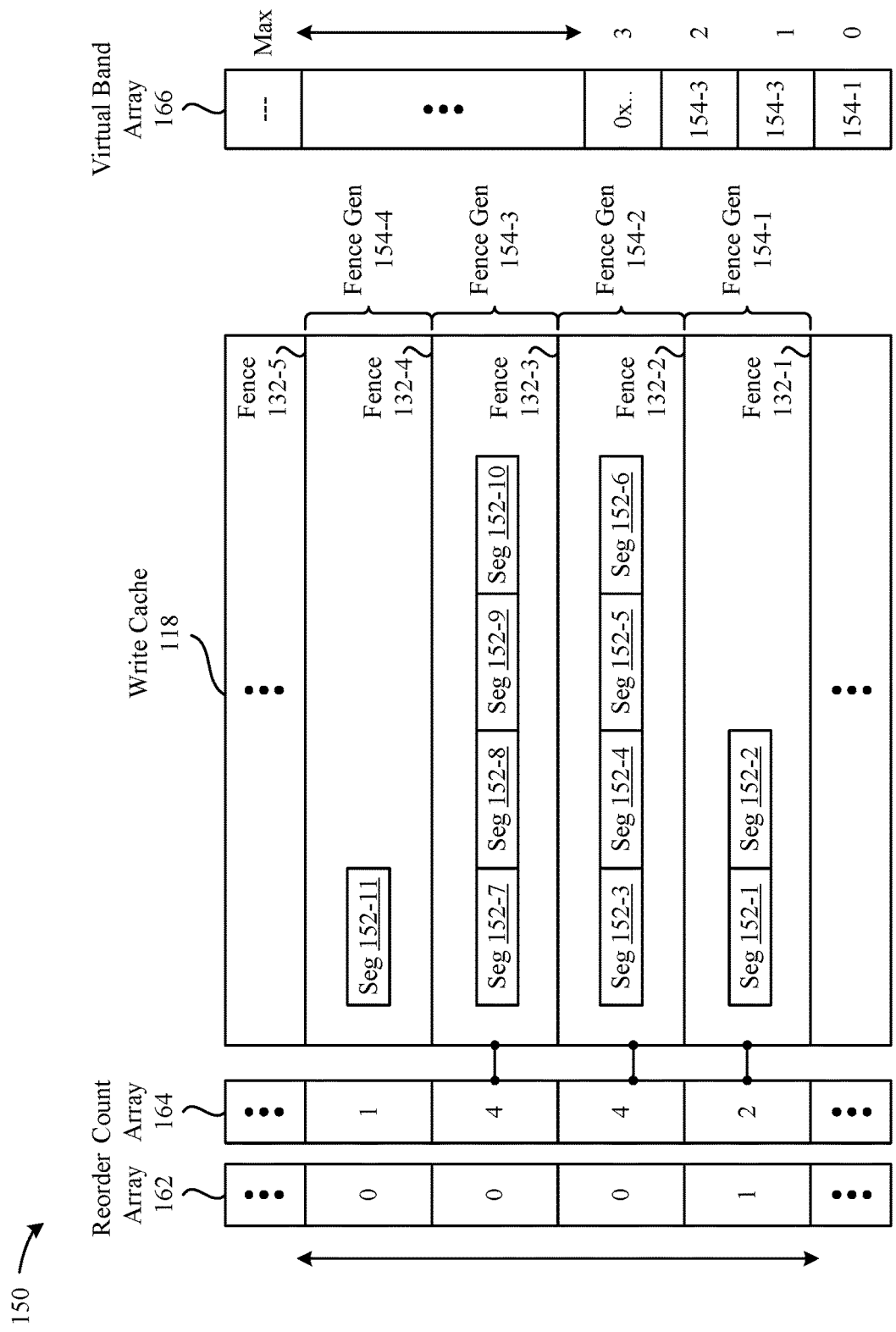

Accordingly, FIG. 1A provides an overview of the manner in which the computing device 102 may be configured to implement the techniques described herein, according to some embodiments. A more detailed breakdown of the write cache 118 will now be provided in conjunction with FIG. 1B. As shown in FIG. 1B, a conceptual diagram 150 includes an example breakdown of the manner in which information may be managed within the write cache 118 by the write cache manager 116. In particular, the example breakdown illustrates a snapshot of the write cache 118 in which four different fence generations 154 (e.g., information associated with the write commands 132 that indicate and preserve an order of the write commands 132) are being managed by the write cache manager 116. According to some embodiments, each fence generation 154 may represent a period of time in which write commands 130 are received by the write cache manager 116 between two different fence commands 132. For example, the fence generation 154-1 may be established between a fence command 132-1 and a fence command 132-2. Similarly, the fence generation 154-2 may be established between the fence command 132-2 and a fence command 132-3, while the fence generation 154-3 may be established between the fence command 132-3 and a fence command 132-4. Finally, the fence generation 154-4 may be established between the fence command 132-4 and a fence command 132-5.

As shown in FIG. 1B, the write cache 118 may be configured to enable the write cache manager 116 to simultaneously track up to two hundred and fifty-six (256) different fence generations 154. However, it is noted that this number is merely exemplary, and that the write cache manager 116/write cache 118 may be configured to manage any number of fence generations 154 without departing from the scope of this disclosure. In any case, as shown in FIG. 1B, each fence generation 154 may include one or more segments 152, where each segment 152 represents one or more write commands 130 received by the storage device 112 during the fence generation 154. According to some embodiments, the write cache manager 116 may maintain an overall count of unprocessed segments 152 for each fence generation 154 using a count array 164 that maps to the write cache 118. For example, as shown in FIG. 1B, the count array 164 indicates that fence generation 154-1 is associated with two unprocessed segments 152, the fence generation 154-2 is associated with four unprocessed segments 152, the fence generation 154-3 is associated with four unprocessed segments 152, and the fence generation 154-4 is associated with one unprocessed segment 152. Accordingly, the write cache manager 116 may be configured to update, within the count array 164, the corresponding entry for a given fence generation 154 each time a segment 152 within the fence generation 154 is received/processed. In this regard, the write cache manager 116 may utilize the count array 164 to readily identify fence generations 154 whose corresponding segments 152 have all been processed.

Additionally, as shown in FIG. 1B, the write cache manager 116 may maintain a reorder array 162 that may be used to indicate fence generations 154 in the write cache 118 whose corresponding segments 152 have been reordered (e.g., by the write cache manager 116), and thus no longer obey the ordering contracts established using fence commands 132 issued by the operating system 108/applications 110. In particular, a value of "1" (i.e., true) may indicate a valid stop point that obeys the fence contract if all data within the corresponding fence generation 154 exists at the end of a replay of the log information 122. Conversely, a value of "0" (i.e., false) may indicate a starting point of one or more fence generations 154 whose corresponding segments 152 have been reordered.

Additionally, as shown in FIG. 1B, the write cache manager 116 may maintain a virtual band array 166 that may be used to identify virtual bands (described below in conjunction with FIG. 1C) that may be safely erased after fence generations 154 have been successfully reflected within the log information 122. Notably, when write commands 130 (associated with segments 152) are reordered across a fence generation 154, and a sudden power loss occurs, a replay of the log information 122 might stop at an older fence generation 154 that includes pointers to virtual bands 134 within the non-volatile memory 120 that are invalid. In this regard, the virtual bands 134 cannot be erased until the updates to the log information 122 reach a relevant stopping point of fence generations 154, which may be maintained/identified using the virtual bands array 166. According to some embodiments, the association between the write cache 118 and the virtual bands array 166 may be tracked by the write cache manager 116 when the log information 122 is updated from inside of one of the reordered fence generations 154, as the write cache manager 116 is privy to the previous locations of the write commands 130.

Figure 1C:
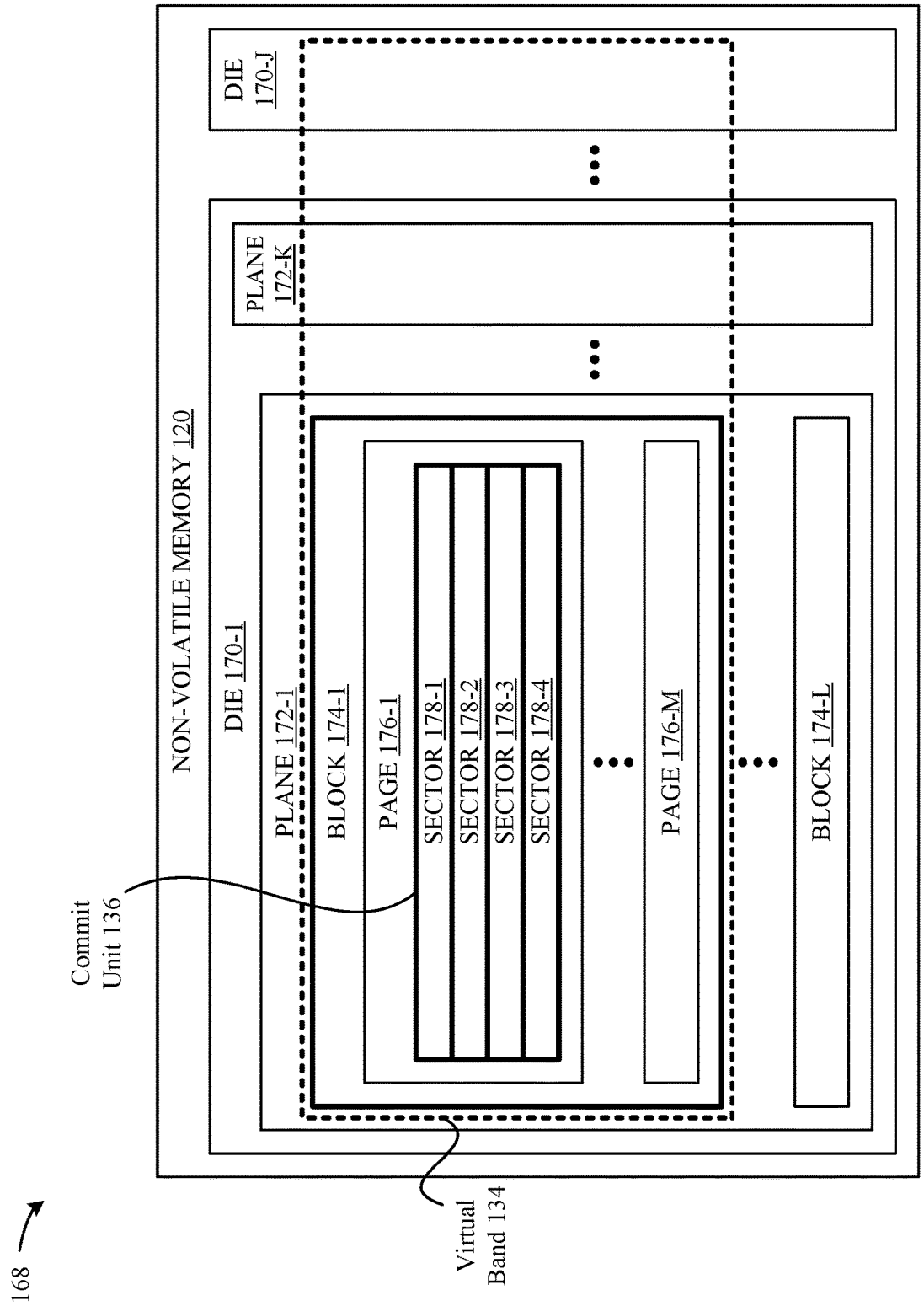

Accordingly, FIG. 1B provides an overview of the manner in which the write cache manager 116 may implement the write cache 118, according to some embodiments. Turning now to FIG. 1C, a more detailed breakdown of the manner in which the non-volatile memory 120 may be segmented is provided. As shown in the conceptual diagram 168 illustrated in FIG. 1C, the non-volatile memory 120 may include one or more dies 170, where each die 170 is separated into one or more planes 172. Additionally, as shown in FIG. 1C, each plane may be separated into one or more blocks 174, and each block 174 may be separated into one or more pages 176. According to some embodiments, and as shown in FIG. 1C, each page 176 may be composed of four sectors 178, where each sector 178 represents a fixed amount of storage space (e.g., 4 kB or other suitable storage sign). It is noted that the hierarchical breakdown illustrated in FIG. 1C is merely exemplary, and that the non-volatile memory 120 may be segmented into fewer or more areas without departing from the scope of this disclosure. For example, each page 176 may include any number of sectors 178 (e.g., two sectors 178 per page 176) and each sector may be any size (e.g., 2 kB, 8 kB, 16 kB, etc.). In any case, as shown in FIG. 1C, a virtual band 134 may logically encompass one or more blocks 174 across one or more dies 170, while a virtual stripe 182 may logically encompass one or more pages 176 across one or more dies 170. Additionally, as shown in FIG. 1C, a commit unit 136 may correspond to one complete page 176, such that the non-volatile memory 120 has a one page 176 per plane 172 commit unit requirement. It is noted that the commit unit 136 illustrated in FIG. 1C is exemplary, and that the commit unit 136 may be configured to encompass any continuous or distributed partition of the non-volatile memory 120 without departing from the scope of this disclosure.

Accordingly, FIGS. 1A-1C illustrate the manner in which the computing device 102 may be configured to implement the various techniques described herein. A more detailed explanation of these techniques will now be provided below in conjunction with FIGS. 2, 3, 4, 5A-5C, 6, 7, and 8.

As described herein, in some embodiments, the controller 114 may be configured to improve boot time when executing a replay operation. According to some embodiments, the storage device 112 may store namespace data in one or more segments of the non-volatile memory 120. The namespace data may include information corresponding to applications or other data required during a reboot and/or rebuild of a computing system (e.g., data required early in a boot cycle). As described, the indirection information 124 can include all host logical block addresses (LBA) and/or other various data (e.g., statistics, parity, and the like), including namespace data and other data. During an unclean reset of the computing device 102, such namespace data, mapped in the indirection information 124, may be unreadable for a relatively long period of time (e.g., thirty (30) or more seconds). In this regard, the controller 114 may be configured to store the namespace data, such that the namespace data is available earlier in a boot cycle to improve boot times, as will be described.

Typically, namespace data is stored in a dedicated region of the storage device 112. For example, the namespace data may be stored in a "utility" region of the storage device 112 or any other suitable region. The utility region includes memory blocks segmented from a primary region of the storage device 112 and reserved for special namespace data. Data may be stored in redundant blocks using SLC partitions. However, such redundant storage may significantly increase operating and production costs. Additionally, or alternatively, because the data is stored in SLC partitions— and, because the data is updated relatively infrequently—the SLC partitions may be underutilized (e.g., the data may be updated one thousand (1,000) times, despite such partitions being capable of thirty thousand (30,000) program/erase operations).

Accordingly, systems and methods, such as those described herein that improve boot times while improving utilization of such SLC partitions, may be desirable. In some embodiments, the controller 114 may read (e.g., while performing a replay operation responsive to an unclear restart of the computing device 102, during a clean restart of the computing device 102, during a rebuild of the computing device 102, or any other function or scenario associated with the computing device 102) namespace mapping data stored in a first persistent memory partition (e.g., such as a partition of the utility region or other suitable partition) of the computing device 102. The namespace mapping data may indicate locations (e.g., using logical block addresses) of namespace data stored in other partitions of the storage device 112. In some embodiments, the namespace mapping data may include header information indicating a fragments list and an offset. The fragments list may include logical block addresses for memory blocks storing the namespace data and corresponding memory block sizes. The header may be sized in accordance with any suitable header size (e.g., sixteen (16) kilobytes).

In some embodiments, while performing a replay operation, the controller 114 may read the namespace data (e.g., stored in the other partitions of the storage device 112) indicated by the namespace mapping data. In some embodiments, the controller 114 may access the namespace data using a flash translation layer of the storage device 112. The namespace data may be cycled according to a cycle rate of corresponding memory blocks of the storage device 112. In some embodiments, the controller 114, after performing the replay operation, may determine whether indirection data (e.g., as described herein) is synchronized with the namespace mapping data. If the controller 114 determines the indirection data is synchronized with the namespace mapping data, then the controller 114 proceeds reading the namespace data stored in other partitions of the storage device 112 using the indirection data.

Alternatively, if the controller 114 determines that the indirection data is not synchronized with the namespace mapping data, then the controller 114 may traverse memory blocks corresponding to the namespace mapping data and may update the indirection data using the namespace mapping data. For example, the controller 114 may store a fragmentation state in another portion of the utility region (e.g., a sixteen (16) kilobyte portion or other suitable portion size). The controller 114 may utilize an indirection traversal to generate a fragments list for a fast namespace data table. When performing the indirection traversal, the controller 114 may track bands and determine if the number of bands identified during the indirection traversal is greater than a threshold or fragmentation (e.g., which may be greater than sixteen (16) kilobytes or other suitable size). If the controller 14 determines the number of bands is greater than the threshold, then the controller 114 defragments the namespace mapping data and triggers a namespace mapping data synchronization.

In some embodiments, the controller 114 may mark all bands identified by syncing the namespace mapping data with the indirection data as namespace coherent. Such coherent bands may be tracked via a maximum (e.g., sixteen (16) or other suitable maximum) depth namespace array. In some embodiments, the controller 114 may use the coherent bands for garbage collection. The controller 114 may save coherent band flags in a header in the namespace mapping data for use during early reads on a reboot of the computing device 102. Moreover, the controller 114 may, in response to the indirection data being synchronized with the namespace mapping data, read the namespace data stored in the other partitions of the storage device 112 using the indirection data.

In some embodiments, the controller 114 may perform a commit command (e.g., a flush command or other suitable command) to commit to the namespace mapping data. For example, writes, trims, etc. performed by the controller 114 on the namespace data are not committed from the perspective of the controller 114 until the controller 114 sends the commit command. In this manner, if the controller 114 is performing a write operation to store namespace data to the storage device 112, and the computing device 102 is reset prior to the completion of the write operation, then the namespace data may be rolled back to the previous committed state.

Figure 2:
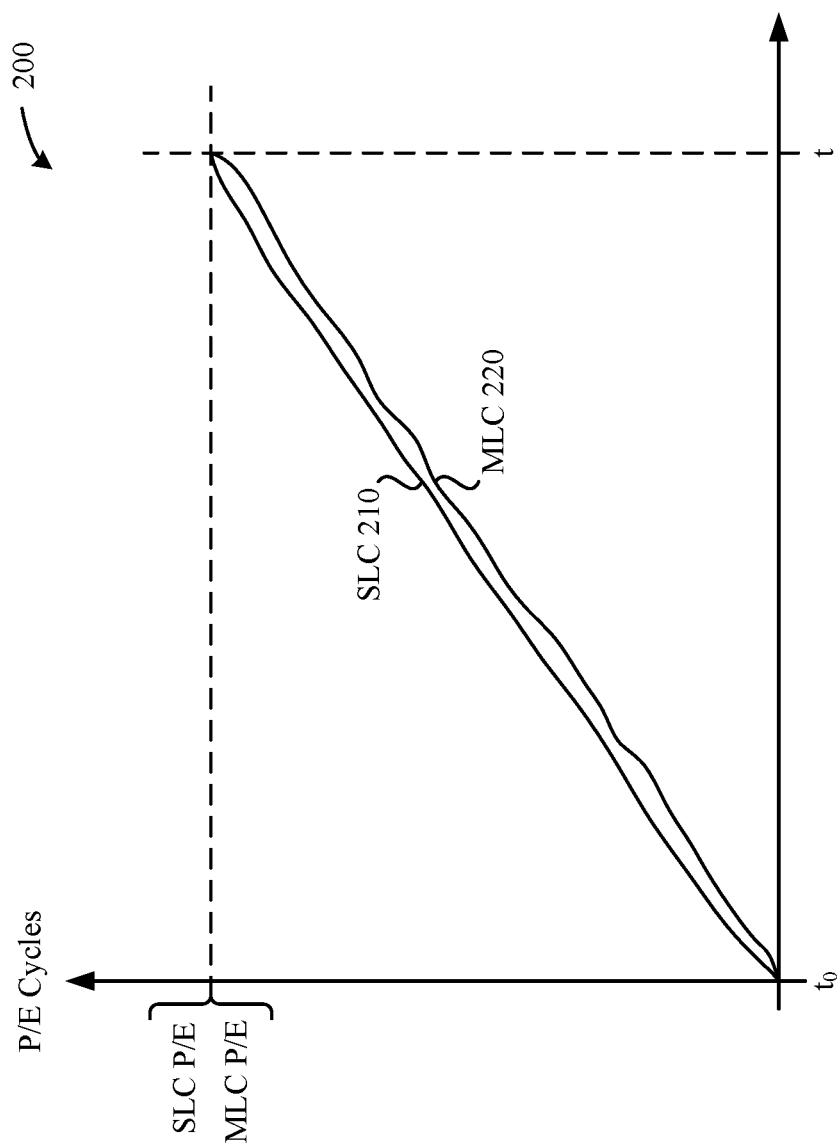
FIG. 2 illustrates a program/erase (P/E) cycle versus time, according to some embodiments.

FIG. 2 illustrates a P/E cycle versus time chart 200, according to some embodiments. The non-volatile memory 120 may be partitioned to include two or more different partition types. For example, the non-volatile memory 120 may be partitioned to have a single-level cell (SLC) partition and a multi-level cell (MLC) partition. As used herein, MLC partition or MLC memory may refer to partitions having two bits per cell, three bits per cell (e.g. triple-level cell (TLC) partition, four bits per cell (e.g., quad-level cell (QLC) partition), and/or other suitable MLC partition. As another example, the non-volatile memory 120 may be partitioned to have an SLC partition, a first MLC partition (e.g., a two-level cell partition), and a second MLC partition (e.g., a TLC partition). In some embodiments, the non-volatile memory 120 may be dedicated solely as a SLC partition or dedicated solely as an MLC partition. In this approach, at least one die is SLC partitioned, and at least one other die is MLC partitioned so that the combination of all non-volatile memory results in a multi-partitioned non-volatile memory arrangement. As another example, each non-volatile memory may be dual partitioned to include both SLC and MLC partitions.

The non-volatile memory 120 may store metadata associated with the non-volatile memory 120. The metadata may include information that describes the data stored in the non-volatile memory 120. The metadata may also include a variety of additional information such as timestamp information (e.g., the time at which a memory cell was last programmed) and wear information (e.g., information indicating the number of times various portions of non-volatile memory have been programmed and/or erased). In some embodiments, metadata associated with the non-volatile memory 120 may be stored in page or block headers (e.g., portions of each page or block that may be dedicated to storing metadata). Storing this metadata in page and/or block headers may be appropriate as program/erase (P/E) cycle counts, write amplifications, time elapsed, and temperature profiles may be localized factors specific to each block and/or page. Additionally, or alternatively, this metadata may be stored in a separate table that may be accessed by host controller 114 to make temperature-based move decisions. For example, during operation a table including metadata may be stored in associated volatile memory.

Each partition type can be associated with a program/erase endurance (also referred to as endurance, hereafter) that may refer to the average number of P/E cycles the non-volatile memory of that type may endure before it fails. A P/E cycle refers to the number of times a block (or another erasable segment) has been erased. SLC non-volatile memory is typically much more robust relative to MLC non-volatile memory. As an example, SLC non-volatile memory may average 100,000 P/E cycles, whereas a TLC non-volatile memory may average about 3,000 P/E cycles. Various parameters including P/E cycles, write amplifications, garbage collection, wear leveling, etc. may be maintained by the non-volatile memory 120. For example, controller 114 may log the P/E cycle count for each partition for the non-volatile memory 120 as a whole, or at a die level, a band level, a block level, a page level, or other granular level. The P/E cycle counts may be temporarily stored in the associated volatile memory and may be periodically stored in the non-volatile memory (e.g., at predetermined intervals or prior to shutdown) as metadata. These parameters may be used by a balance proportion scheme according to embodiments discussed herein. The balance proportion scheme ensures that, even though each partition type has a different associated endurance, all partition types are used proportionally with respect to each other to balance their respective P/E cycles. Accordingly, both partition types will reach the upper limits of respective endurance levels at approximately the same time.

As shown in FIG. 2, the chart 200 illustrates time along the x-axis and includes time, t, which may represent the minimum operational lifetime of the non-volatile memory. Chart 200 also illustrates P/E cycles for two different partition types: one for SLC and another for MLC, where the SLC P/E cycles value has been scaled down to have a one-to-one parity with the MLC P/E cycles. In the illustrated example, the endurance of the SLC partition is substantially greater than the endurance of the MLC partition (e.g., 10, 20, 30, or some other multiplication factor more than the average P/E cycles of the MLC partition). As illustrated in FIG. 2, the SLC line 210 and the MLC line 220 are approximately on parity with each other from time "to" to time "t" and closely follow an ideal endurance slope. This illustrates that the P/E cycles for both SLC and MLC partitions are balanced throughout their respective operational lives.

Figure 3:
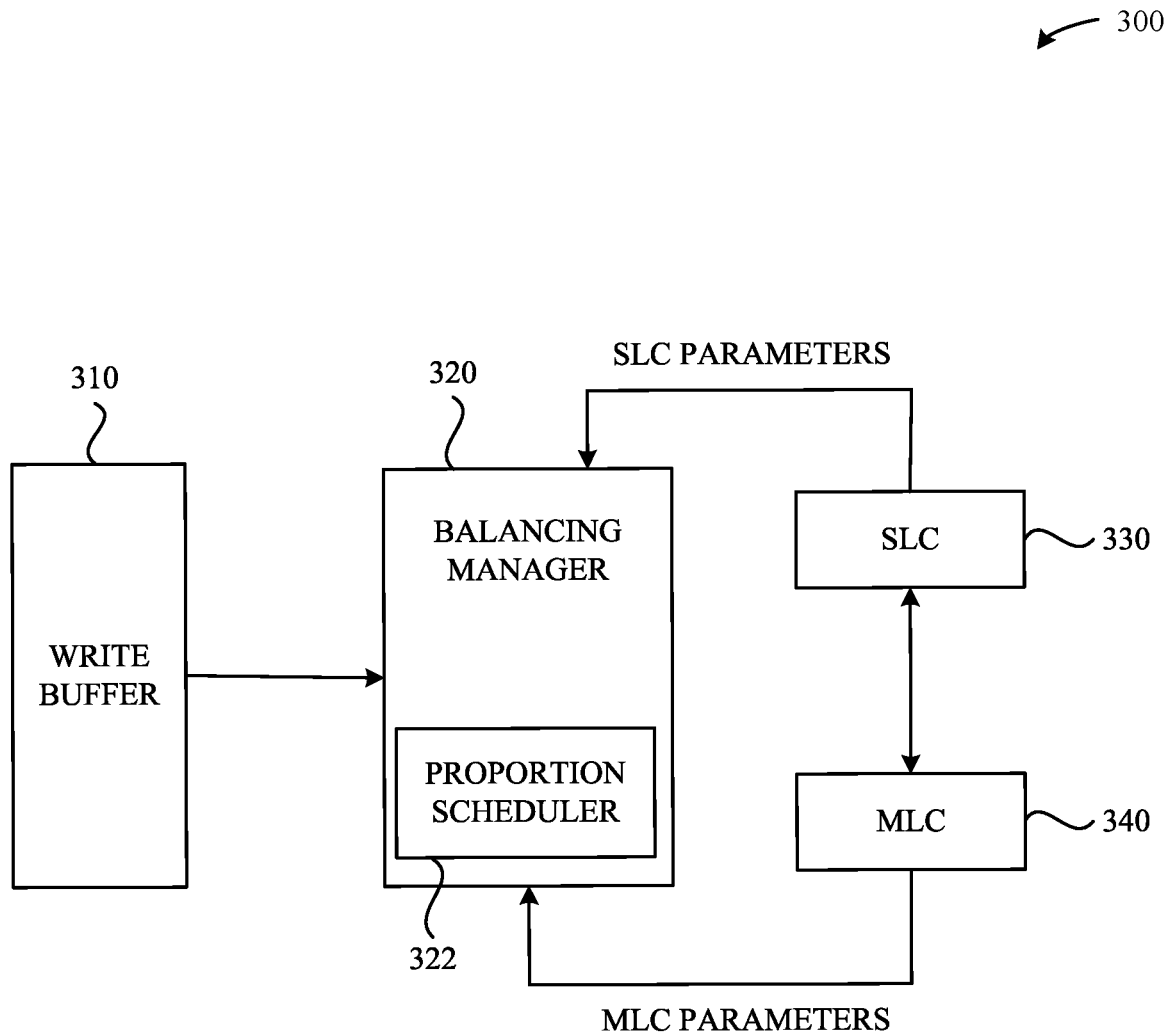
FIG. 3 illustrates a functional block diagram of a write command performance balancing system, according to some embodiments.

FIG. 3 illustrates a block diagram 300 that includes functional blocks for executing a proportional balancing scheme, according to some embodiments. As shown, FIG. 3 may include a write buffer 310, a balancing manager 320, an SLC partition 330, and an MLC partition 340. Write buffer 310 and balancing manager 320 may be implemented, for example, in the controller 114 described herein. SLC partition 330 and MLC partition 340 may be embodied in the non-volatile memory 120, or other suitable non-volatile memory. Write buffer 310 may represent a data source that provides data to be written to the non-volatile memory. For example, the write buffer 310 may include the write cache 118 or other suitable data source or may be in communication with the write cache 118 or other suitable data source. As the data is being transmitted from the write buffer 310 to the non-volatile memory, the balancing manager 320 may direct the data to the SLC partition 330 and the MLC partition 340 based on a proportional balancing scheme according to embodiments discussed herein. SLC parameters (e.g., P/E cycles, write amplifications, and other metadata) may be provided to the balancing manager 320. MLC parameters (e.g., P/E cycles, write amplifications, and other metadata) may be provided to the balancing manager 320. The SLC and MLC parameters may provide an indication of SLC and MLC usage. In some embodiments, SLC and MLC usage may refer to SLC P/E cycles and MLC P/E cycles. In some embodiments, SLC and MLC usage may collectively consider P/E cycles, write amplifications, and temperature. It should be understood that the SLC and MLC parameters may be provided to the balancing manager 320 from locations other than the SLC and MLC partitions. Garbage collection operations (shown as GC) may also be performed on both SLC and MLC partitions.

In some embodiments, the balancing manager 320 may independently determine how best to proportionally balance writes to the SLC and MLC based on the MLC and SLC parameters. That is, based on the knowledge of SLC and MLC endurance, the balancing manager 320 may detect when a deviation between SLC and MLC endurance exceeds a threshold—and, when that threshold is exceeded, the balancing manager 320 may auto-calculate how to proportionally balance writes to compensate for the deviation and to ensure that the SLC and MLC partitions stay balanced throughout their operational lives. For example, balancing manager 320 may evaluate the SLC and MLC parameters to determine whether SLC partition 330 is "overheating" or whether MLC partition 340 is "overheating," and, depending on whether which partition is "overheating," balancing manager 320 may determine how writes should be directed from the write buffer 310 to SLC partition 330 and MLC partition 340. A partition may be overheating when its proportional usage outweighs the proportional usage of another partition. Thus, if the SLC partition is overheating, then balancing manger 320 may adjust the write balance to "cool down" writes to the SLC partition relative to the MLC partition so that both the SLC and MLC partitions approximate the ideal endurance slope.

In some embodiments, the balancing manager 320 may access the proportion scheduler 322, which may manage a look up table that specifies how to proportionally balance writes to the SLC and MLC based on the SLC and MLC parameters. That is, the balancing manager 320 may evaluate the SLC and MLC parameters to determine whether SLC partition 330 is "overheating" or whether MLC partition 340 is "overheating," and depending on whether a partition is "overheating," the lookup table in proportion scheduler 322 may be accessed to determine how writes should be directed from the write buffer 310 to the SLC partition 330 and the MLC partition 340. Thus, if the SLC partition 330 is overheating, then balancing manager 320 may access an SLC specific schedule in proportion scheduler 322. Alternatively, if the MLC partition 340 is overheating, then the balancing manager 320 may access an MLC specific schedule in the proportion scheduler 322.

FIG. 4 illustrates an example schedule 400 for SLC overheating. As shown in FIG. 4, the schedule 400 can include two columns: a first column labeled "SLC/TLC P/E Difference %", and a second column labeled "TLC %/SLC %." The SLC/TLC P/E Difference % column represents the percentage difference between the average P/E cycles of the SLC partition and the average P/E cycles of the MLC partition. In some embodiments, the SLC/TLC P/E Difference % may be calculated based on the following equation:

$$\mathit{Diff}\ \% = \frac{(SLC\_PE\_AVG - TLC\_PE\_AVG * S)}{SLC\_PE\_AVG}$$

where "SLC_PE_AVG" is the average P/E cycle usage of the SLC partition, "TLC_PE_AVG" is the average P/E cycle usage of the TLC partition, and "S" is the scalar of the endurance difference between the SLC and TLC partitions. For example, if the SLC partition is thirty times more durable than the TLC partition, then S is thirty (30). As show in the schedule 400, if the SLC/TLC P/E Difference % falls between 1-9%, then the balancing manager 320 may direct five (5) units of data to the TLC partition for every eighty (80) units of data that are directed to the SLC partition. Schedule 400 also shows how the unit proportion balance changes depending on the range of SLC/TLC P/E Difference %. As the SLC partition becomes progressively overheated (e.g., approaching 100%), the proportional balance skews more heavily towards TLC versus SLC. For example, at 100%, the balancing manager 320 may direct nine (9) units of data to the TLC partition for every nineteen (19) units of data directed to the SLC partition.

The TLC %/SLC % column illustrates how units of data are directed to the TLC and SLC partitions in accordance with the SLC/TLC P/E Difference %. Units may be represented by any suitable size data chunk stored in the non-volatile memory 120. For example, a unit may be a page, a block, a combination of pages or blocks, a stripe, a band, or a portion of a band. In some embodiments, the unit is sized to strike a balance between increasing performance of the non-volatile memory and the overall indirection fragmentation. For example, in one embodiment, with respect to the SLC partition, the unit may be ⅛th of a band, and with respect to the TLC partition, the unit may be ⅛th of a band. In another embodiment, a unit may include several stripes.

While the examples described herein refer to maintaining a balance between SLC and MLC partitions or a balance between SLC and TLC partitions, it should be understood that the balancing concepts may be used for maintaining a balance between partitions each having different endurances. For example, a first partition may correspond to a first endurance and a second partition may correspond to a second endurance that is distinct to the first endurance of the first partition. As a specific example, a first partition may correspond to 3-bit level cells and the second partition may correspond to 1-bit level cells. However, it should be understood that the first partition may correspond to any suitable number of bits per cell, such as 1-bit level cells, 2-bit level cells, 3-bit level cells, or any other stable number of bits per cell. Additionally, or alternatively, it should be understood that the second partition may correspond to any suitable number of bits per cell, such as 1-bit level cells, 2-bit level cells, 3-bit level cells, or any other stable number of bits per cell.

In some embodiments, the controller 114 (e.g., using the balancing manager 320) may be configured to balance write commands by directing data to the SLC partition 330 and the MLC partition 340 based on the available capacity of the write cache 118. According to some embodiments, the controller 114 receives a plurality of write commands and caches them into the write cache 118. Next, the controller 114 can determine whether an available capacity of the write cache 118 is greater than or equal to a first threshold value that corresponds to a total capacity of the write cache 118. The available capacity of the write cache 118 may correspond to an amount of available storage space within the write cache 118 after the write commands are cached by the controller 114 to the write cache 118.

In some embodiments, in response to a determination that the available capacity of the write cache 118 is greater than or equal to the first threshold value, the controller 114 may determine whether an available capacity of the MLC partition 340 is greater than or equal to a second threshold value. The second threshold may correspond to a total capacity or budget of the MLC partition 340, whereas the available capacity of the MCL 340 may correspond to an amount of available storage space or an amount of available budget of the MLC partition 340.

In some embodiments, in response to a determination that the available capacity of the MLC partition 340 is greater than or equal to the second threshold value, the controller 114 may perform at least one write operation by directing data associated with the write commands in the write cache 118 to the MLC partition 340 (e.g., the controller 114 may direct data to the MLC partition 340, as described). Additionally, or alternatively, in response to a determination that the available capacity of the MLC partition 340 is less than the second threshold value, the controller 114 may perform at least one write operation by directing data associated with the write commands in the write cache 118 to the SLC partition 330 (e.g., the controller 114 may direct data to the SLC partition 330, as described).

In some embodiments, in response to a determination that the available capacity of the write cache 118 is less than the first threshold value, the controller 114 may determine whether an available capacity of the SLC partition 330 is greater than or equal to a third threshold value. The third threshold may correspond to a total capacity or budget of the SLC partition 330. The available capacity of the SLC partition 330 may correspond to an amount of available storage space or an amount of available budget) of the SLC partition 330. In response to a determination that the available capacity of the SLC partition 330 is greater than or equal to the third threshold value, the controller 114 may perform at least one write operation by directing data associated with the write commands in the write cache 118 to the SLC partition 330 (e.g., the controller 114 may direct data to the MLC partition 340, as described).

In some embodiments, in response to a determination that the available capacity of the SLC partition 330 is less than the third threshold value, the controller 114 may perform at least one write operation by directing data associated with the write commands in the write cache 118 to the MLC partition 340. In some embodiments, in response to a determination that the available capacity of the SLC partition 330 is less than the third threshold value, the controller 114 may determine, after performing at least one write operation by directing data associated with the write commands in the write cache 118 to the SLC partition 330, whether the available capacity of the write cache 118 is less than the first threshold value (e.g., the controller 114 may determine whether the write cache 118 is full). In response to a determination that the available capacity of the write cache 118 is less than the first threshold value, the controller 14 may modify at least one characteristic of the MLC partition 340. For example, the controller 114 may convert the MCL 340 to an SLC partition. The controller 114 may perform at least one write operation by directing data associated with the write commands in the write cache 118 to the MLC partition 340 (e.g., converted to an SLC partition).

Figure 5A:
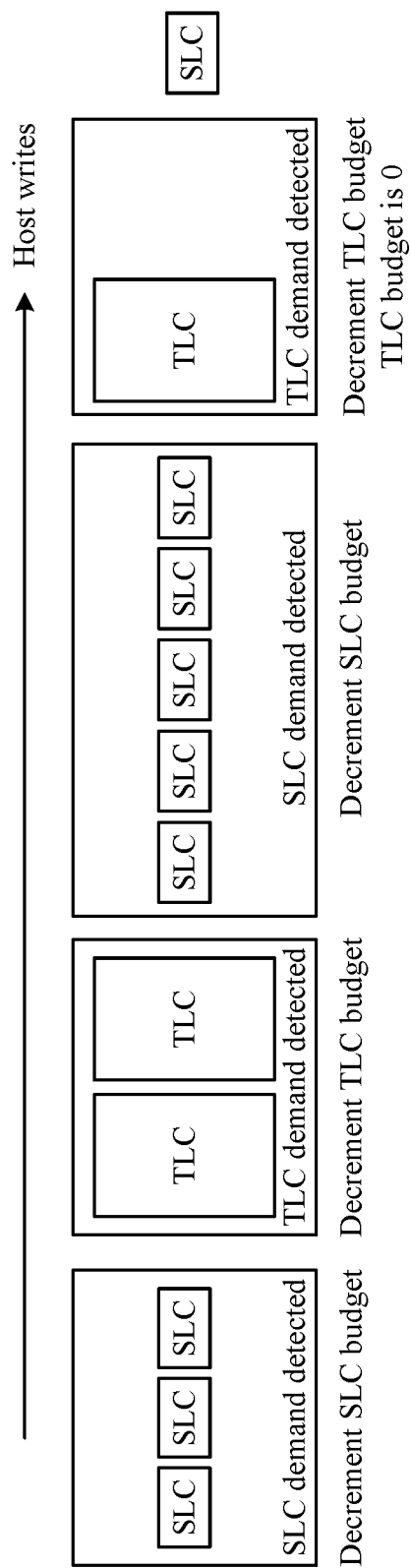
FIGS. 5A-5C illustrate data being directed to single-level cell partitions and multi-level cell partitions, according to some embodiments.
Figure 5B:
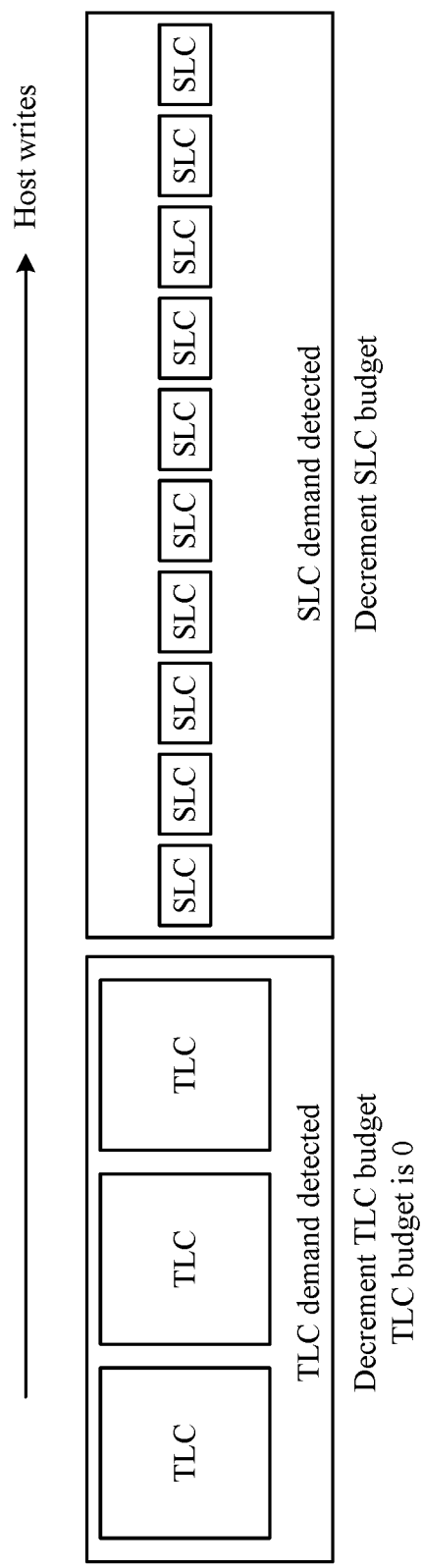
Figure 5C:
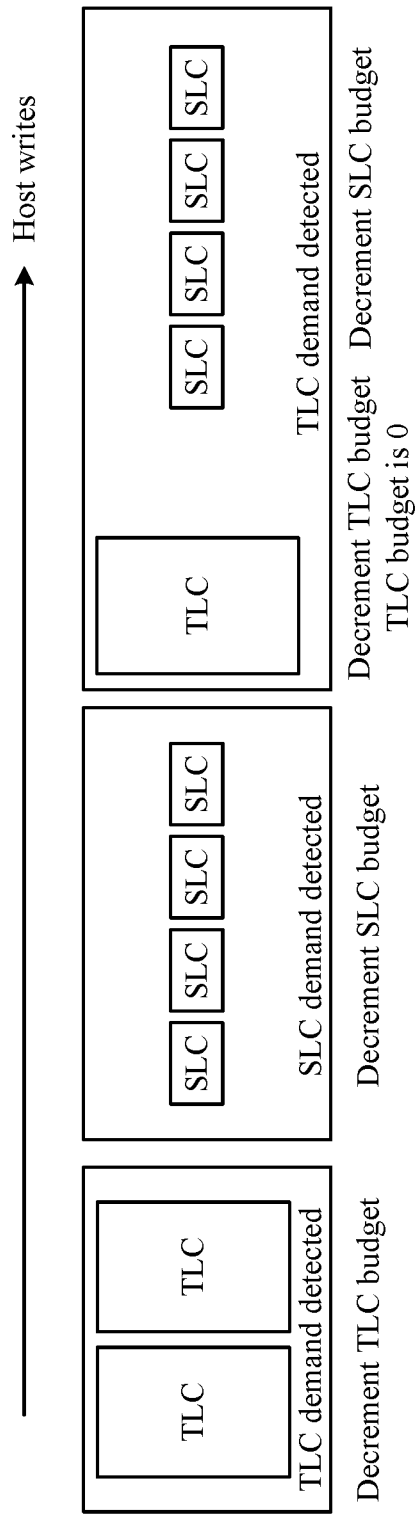

FIGS. 5A-5C illustrate data being directed to SLC and TLC partitions in accordance with a balancing technique, according to some embodiments. Each block shown in FIGS. 5A-5C is represented by a unit for its partition type. For example, each block may represent data stored in a portion of a band. As illustrated in FIG. 5A, as host writes come in from the write cache 118, several SLC blocks are written for every TLC block. For example, three SLC blocks are written before two TLC blocks are written. As described herein, the controller 114 may determine that data should be directed to the SLC partition 330. As data is directed to the SLC partition 330, an SLC budget (e.g., which may include a list, flag, counter, etc.) is modified (e.g., decremented or incremented when a numerical approach is implemented). Similarly, as the controller 114 directs data to the MLC partition 340 (e.g., represented by TCL blocks in FIGS. 5A-5C), the controller 114 modifies (e.g., decrements or increments) the MLC budget.

FIG. 5B illustrates data being directed to the MLC partition 340 by the controller 114 until the MLC partition 340 budget is depleted (e.g., the budget is decremented to zero (0)). The controller 114 may direct data to the SLC partition 330 in response to a determination that the MLC partition 340 budget is depleted (e.g., that the available capacity of the MLC partition 340 is greater than or equal to the second threshold). FIG. 5C illustrates the controller 114 directing data to the MLC partition 340, and, in response to determining to direct data to the SLC partition 330, directing data to the SLC partition 330. Additionally, or alternatively, the controller 114 may determine, after directing data to the SLC partition 330, to direct data to the MLC partition 340, as described. The controller 114 may then determine that the MLC partition 340 budget is depleted and may subsequently direct data to the SLC partition 330.

Figure 6:
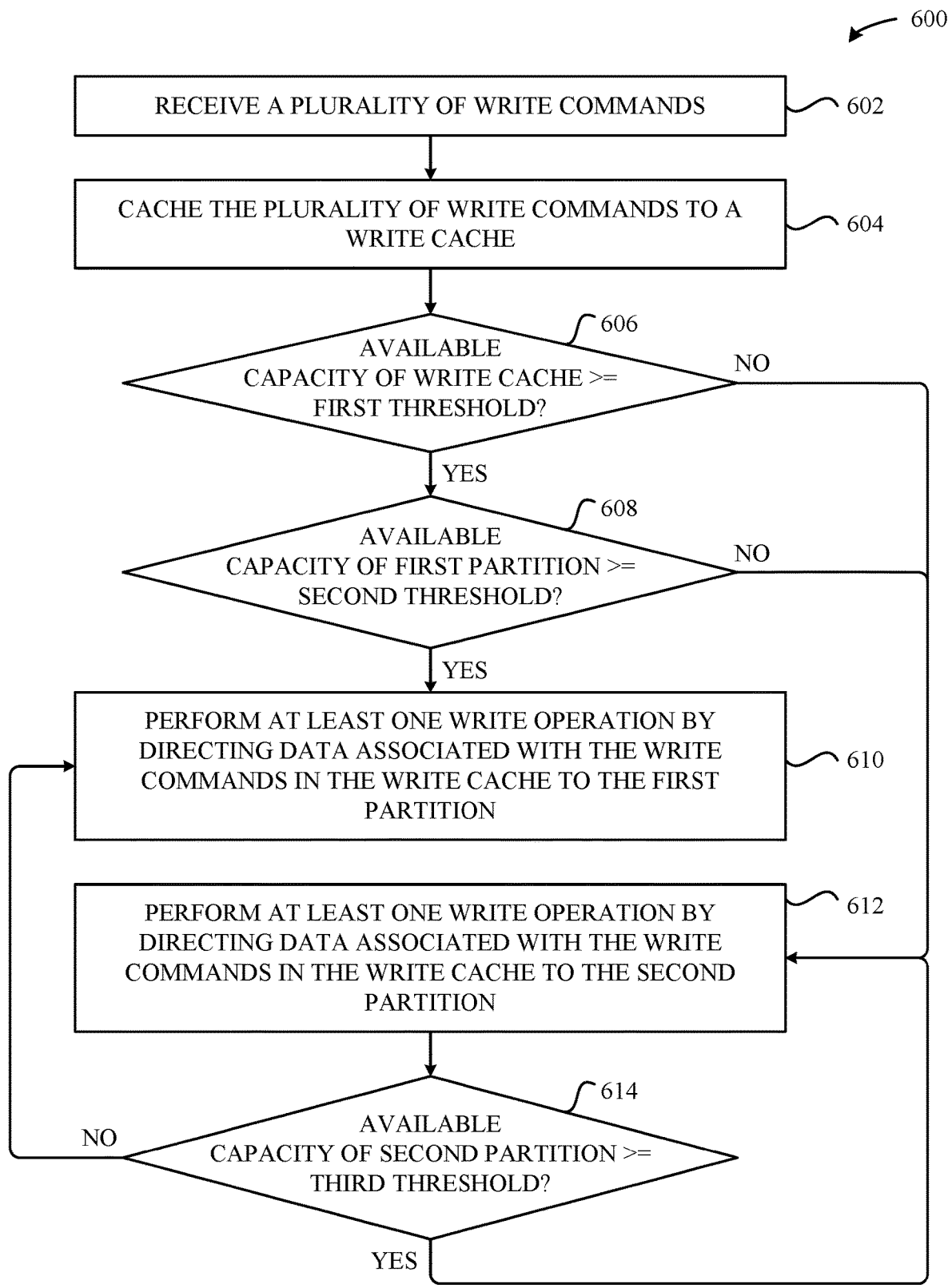
FIG. 6 is a flow diagram for a write command performance balancing method, according to some embodiments.

FIG. 6 is a flow diagram for a write command performance balancing method 600, according to some embodiments. According to some embodiments, the method 600 can be implemented by the controller 114, and/or by any other software and/or hardware accessible to the computing device 102. At 602, the controller 114 receives a plurality of write commands. At 604, the controller 114 caches the plurality of write commands to a write cache, e.g., the write cache 118 described herein.

At 606, the controller 114 determines whether an available capacity of the write cache 118 is greater than or equal to a first threshold. If the controller 114 determines that the available capacity of the write cache 118 is greater than or equal to the first threshold, then the method 600 continues to 608. Alternatively, if the controller 114 determines that the available capacity of the write cache 118 is not greater than or equal to (e.g., is less than) the first threshold, then the method 600 continues to 612.

At 608, the controller 114 determines whether an available capacity of a first partition of a non-volatile memory is greater than or equal to a second threshold. For example, the controller 114 may determine whether the available capacity of the MLC partition 340 (e.g., comprising a TLC partition or other suitable multi-level cell partition) is greater than or equal to the second threshold. If the controller 114 determines that the available capacity of the MLC partition 340 is greater than or equal to the second threshold, then the method 600 continues to 610. Alternatively, if the controller 114 determines that the available capacity of the MLC partition 340 is not greater than or equal to (e.g., is less than) the second threshold, the method 600 continues to 612.

At 610, the controller 114 performs at least one write operation by directing data associated with the write commands in the write cache to the first partition. For example, the controller 114 may perform the at least one write operation by directing data associated with the write commands in the write cache 118 to the MLC partition 340. Alternatively, at 612, the controller 114 performs at least one write operation by directing data associated with the write commands in the write cache to the second partition. For example, the controller 114 may perform the at least one write operation by directing data associated with the write commands in the write cache 118 to the SLC portion 330. It should be understood that, while the second partition is described as including SLC partition, the second partition may include an SLC partition, an MLC partition, or any suitable partition.

At 614, the controller 114 determines whether the available capacity of the second partition is greater than or equal to a third threshold. For example, the controller 114 may determine whether the available capacity of the SLC partition 330 is greater than or equal to the third threshold. If the controller 114 determines that the available capacity of the SLC partition 330 is greater than or equal to the third threshold, then the method 600 continues to 612. Alternatively, if the controller 114 determines that the available capacity of the SLC partition 330 is not greater than or equal to (e.g., is less than) the third threshold, then the method 600 continues to 610.

Figure 7:
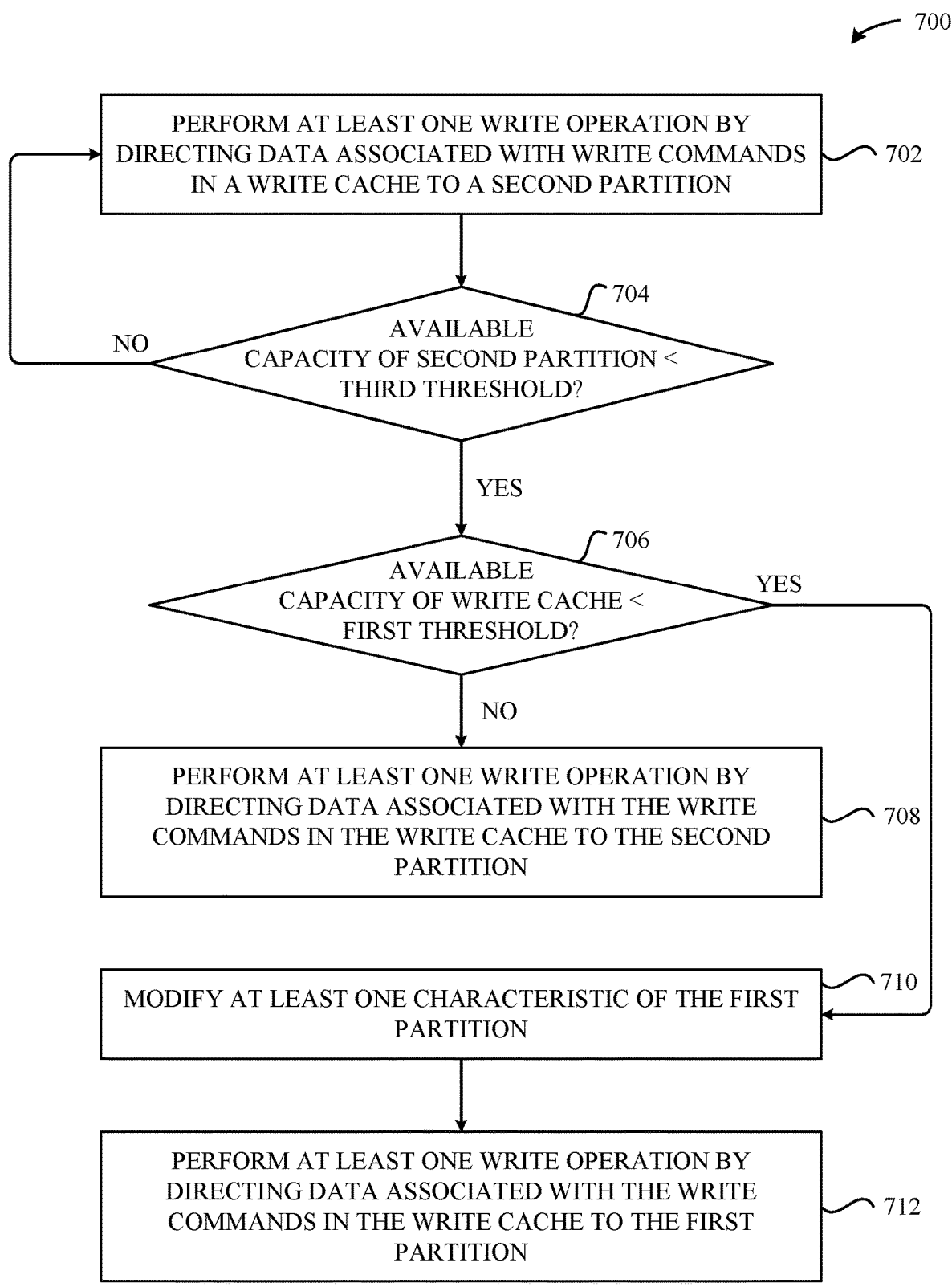
FIG. 7 is a flow diagram for an alternative write command performance balancing method, according to some embodiments.

FIG. 7 is a flow diagram for an alternative write command performance balancing method 700, according to some embodiments. According to some embodiments, the method 700 can be implemented by the controller 114, and/or by any other software and/or hardware accessible to the computing device 102. At 702, the controller 114 performs at least one write operation by directing data associated with write commands in a write cache to a second partition. For example, the controller 114 may perform the at least one write operation by directing data associated with the write commands in the write cache 118 to the SLC partition 330.

At 704, the controller 114 determines whether an available capacity of the second partition is less than a third threshold. For example, the controller 114 may determine whether the available capacity of the SLC partition 330 is less than the third threshold. If the controller 114 determines that the available capacity of the SLC partition 330 is less than the third threshold, then the method 700 continues to 706. Alternatively, if the controller 114 determines that the available capacity of the SLC partition 330 is not less than (i.e., is greater than or equal to) the third threshold, then the method 700 returns back to 702.

At 706, the controller 114 determines whether an available capacity of the write cache is less than a first threshold. For example, the controller 114 may determine whether the available capacity of the write cache 118 is less than the first threshold. If the controller 114 determines that the available capacity of the write cache 118 is less than the first threshold, then the method 700 continues to step 710. Alternatively, if the controller 114 determines that the available capacity of the write cache 118 is not less than (i.e., is greater than or equal to) the first threshold, then the method 700 continues to 708.

At 708, the controller 114 performs at least one write operation by directing data associated with the write commands in the write cache to the second partition. For example, the controller 114 may perform the at least one write operation by directing data associated with the write commands in the write cache 118 to the SLC partition 330.

At 710, the controller 114 modifies at least one characteristic of the first partition. For example, the controller 114 may modify the at least one characteristic of the MLC partition 340, which can include converting the MCL 340 to an SLC partition.

At 712, the controller 114 performs at least one write operation by directing data associated with the write commands in the write cache to the first partition. For example, the controller 114 may perform the at least one write operation by directing data associated with the write commands in the write cache 118 to the MLC partition 340 (e.g., after converting the MLC partition 340 to an SLC partition).

Figure 8:
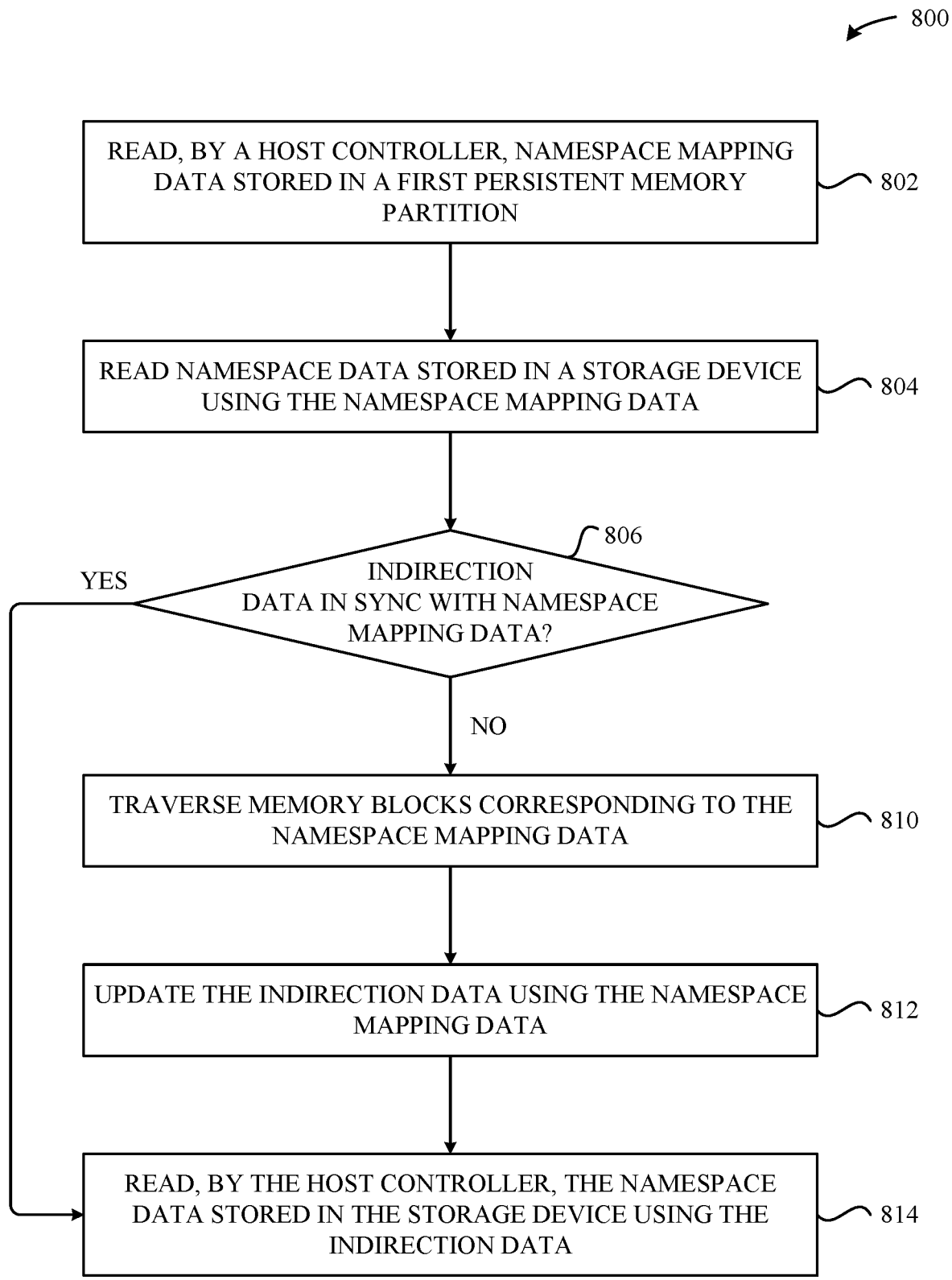
FIG. 8 is a flow diagram for a boot time improvement method, according to some embodiments.

FIG. 8 is a flow diagram for a boot time improvement method 800, according to some embodiments. According to some embodiments, the method 800 can be implemented by the controller 114, and/or by any other software and/or hardware accessible to the computing device 102. At 802, the controller 114 may read namespace mapping data stored in a first persistent memory partition. For example, the controller 114 may read the namespace mapping data stored a utility region of an SLC partition.

At 804, the controller 114 reads namespace data stored in a storage device using the namespace mapping data. For example, the controller 114 may read the namespace data stored in the other partitions of the storage device 112 using the namespace mapping data. The controller 114 may access the namespace data using the flash translation layer of the storage device 112.

At 806, the controller 114 determines whether indirection data is synchronized with the namespace mapping data. If the controller 114 determines that the indirection data is synchronized with the namespace mapping data, then the method 800 continues to 814. Alternatively, if the controller 114 determines that the indirection data is not synchronized with the namespace mapping data, then the method 800 continues to 810.

At 810, the controller 114 traverses memory blocks corresponding to the namespace mapping data. For example, the controller 114 may traverse the memory blocks corresponding to the namespace mapping data. At 812, the controller 114 updates the indirection data using the namespace mapping data. For example, the controller 114 may update the indirection data to reflect the information indicated by the namespace mapping data.

At 814, the controller 114 may read the namespace data stored in the storage device using the indirection data. For example, the controller 114 may read, using the flash translation layer, the namespace data stored in other partitions of the storage device 112 based on information indicated by the indirection data.

Figure 9:
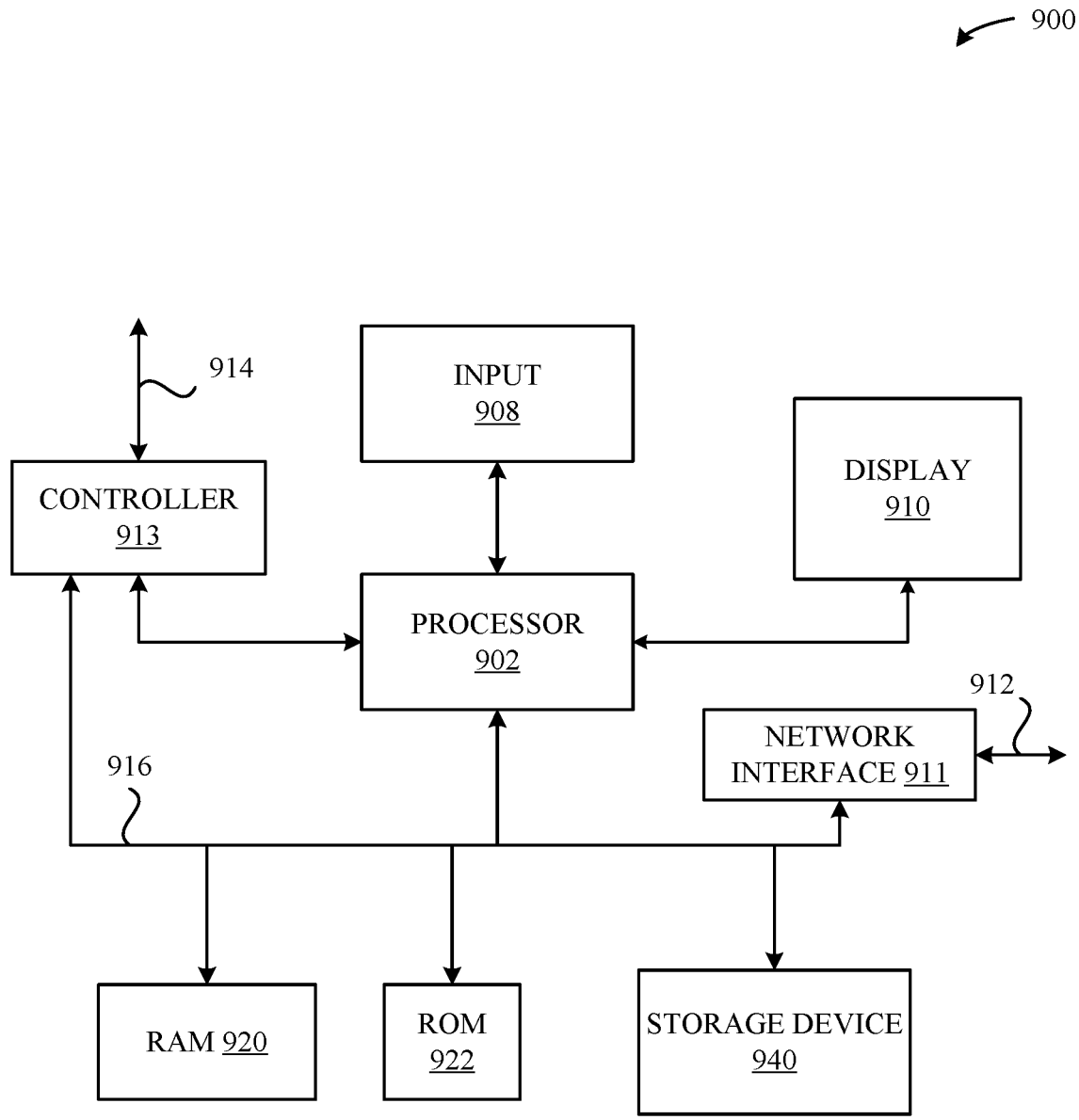
FIG. 9 illustrates a detailed view of a computing device that may be used to implement the various components described herein, according to some embodiments.

FIG. 9 illustrates a detailed view of a computing device 900 that may be used to implement the various components described herein, according to some embodiments. In particular, the detailed view illustrates various components that may be included in the computing device 102 illustrated in FIG. 1A. As shown in FIG. 9, the computing device 900 may include a processor 902 that represents a microprocessor or controller for controlling the overall operation of computing device 900. The computing device 900 may also include a user input device 908 that allows a user of the computing device 900 to interact with the computing device 900. For example, the user input device 908 may take a variety of forms, such as a button, keypad, dial, touch screen, audio input interface, visual/image capture input interface, input in the form of sensor data, etc. Still further, the computing device 900 may include a display 910 (screen display) that may be controlled by the processor 902 to display information to the user. A data bus 916 may facilitate data transfer between at least a storage device 940, the processor 902, and a controller 913. The controller 913 may be used to interface with and control different equipment through and equipment control bus 914. The computing device 900 may also include a network/bus interface 911 that couples to a data link 912. In the case of a wireless connection, the network/bus interface 911 may include a wireless transceiver.

The computing device 900 also includes a storage device 940, which may comprise a single disk or a plurality of disks (e.g., SSDs), and includes a storage management module that manages one or more partitions within the storage device 940. In some embodiments, storage device 940 may include flash memory, semiconductor (solid state) memory or the like. The computing device 900 may also include a Random-Access Memory (RAM) 920 and a Read-Only Memory (ROM) 922. The ROM 922 may store programs, utilities, and/or processes to be executed in a non-volatile manner. The RAM 920 may provide volatile data storage, and stores instructions related to the operation of the computing device 102.

The various aspects, embodiments, implementations or features of the described embodiments may be used separately or in any combination. Various aspects of the described embodiments may be implemented by software, hardware or a combination of hardware and software. The described embodiments may also be embodied as computer readable code on a computer readable medium. The computer readable medium is any data storage device that may store data which may thereafter be read by a computer system. Examples of the computer readable medium include read-only memory, random-access memory, CD-ROMs, DVDs, magnetic tape, hard disk drives, solid state drives, and optical data storage devices. The computer readable medium may also be distributed over network-coupled computer systems so that the computer readable code is stored and executed in a distributed fashion.

What is claimed is:

1. A method for balancing write commands directed to a non-volatile memory that includes first and second partitions, the method comprising, at a computing device that is communicably coupled to the non-volatile memory:
caching write commands into a write cache of the computing device;
in response to determining that an available capacity of the write cache satisfies a first threshold:
directing at least one write command to the first partition in response to determining that an available capacity of the first partition satisfies a second threshold, and
directing at least one write command to the second partition in response to determining that the available capacity of the first partition does not satisfy the second threshold;
in response to determining that an available capacity of the second partition satisfies a third threshold:
directing at least one write command to the second partition in response to determining that the available capacity of the write cache satisfies the first threshold, and
modifying at least one characteristic of the first partition to cause at least a portion of the first partition to operate under a same cell-level format as the second partition in response to determining that the available capacity of the write cache does not satisfy the first threshold, and directing at least one write command to the at least a portion of the first partition; and
updating the available capacity of the first or second partition to reflect the at least one write command.

2. The method of claim 1, wherein:
the first partition of the non-volatile memory operates under a triple-level cell format; and
the second partition of the non-volatile memory operates under a single-level cell format.

3. The method of claim 1, wherein:
the available capacity of the write cache satisfies the first threshold when the available capacity of the write cache is greater than or equal to the first threshold;
the available capacity of first partition satisfies the second threshold when the available capacity of the first partition is greater than or equal to the second threshold; and
the available capacity of the second partition satisfies the third threshold when the available capacity of the second partition is less than the third threshold.

4. The method of claim 1, further comprising:
in response to determining that the available capacity of the write cache does not satisfy the first threshold:
directing at least one write command to the first partition in response to determining that the available capacity of the second partition satisfies the third threshold.

5. The method of claim 1, further comprising:
in response to determining that the available capacity of the second partition does not satisfy the third threshold:
directing at least one write command to the second partition.

6. The method of claim 1, wherein modifying at least one characteristic of the first partition to cause the at least a portion of the first partition to operate under the same cell-level format as the second partition comprises converting the at least a portion of the first partition from operating under a triple-level cell format to operating under a single-level cell format.

7. The method of claim 1, wherein:
the first threshold is based on a total capacity of the write cache,
the second threshold is based on a total capacity of the first partition, and
the third threshold is based on a total capacity of the second partition.

8. A non-transitory computer readable storage medium configured to store instructions that, when executed by at least one processor included in a computing device, cause the computing device to balance write commands directed to a non-volatile memory that includes first and second partitions, by carrying out steps that include:
caching write commands into a write cache of the computing device;
in response to determining that an available capacity of the write cache satisfies a first threshold:
directing at least one write command to the first partition in response to determining that an available capacity of the first partition satisfies a second threshold, and
directing at least one write command to the second partition in response to determining that the available capacity of the first partition does not satisfy the second threshold;
in response to determining that an available capacity of the second partition satisfies a third threshold:
directing at least one write command to the second partition in response to determining that the available capacity of the write cache satisfies the first threshold, and
modifying at least one characteristic of the first partition to cause at least a portion of the first partition to operate under a same cell-level format as the second partition in response to determining that the available capacity of the write cache does not satisfy the first threshold, and directing at least one write command to the at least a portion of the first partition; and
updating the available capacity of the first or second partition to reflect the at least one write command.

9. The non-transitory computer readable storage medium of claim 8, wherein:
the first partition of the non-volatile memory operates under a triple-level cell format; and
the second partition of the non-volatile memory operates under a single-level cell format.

10. The non-transitory computer readable storage medium of claim 8, wherein:
the available capacity of the write cache satisfies the first threshold when the available capacity of the write cache is greater than or equal to the first threshold;
the available capacity of first partition satisfies the second threshold when the available capacity of the first partition is greater than or equal to the second threshold; and
the available capacity of the second partition satisfies the third threshold when the available capacity of the second partition is less than the third threshold.

11. The non-transitory computer readable storage medium of claim 8, wherein the steps further include:
in response to determining that the available capacity of the write cache does not satisfy the first threshold:

directing at least one write command to the first partition in response to determining that the available capacity of the second partition satisfies the third threshold.

12. The non-transitory computer readable storage medium of claim 8, wherein the steps further include:
in response to determining that the available capacity of the second partition does not satisfy the third threshold:
directing at least one write command to the second partition.

13. The non-transitory computer readable storage medium of claim 8, wherein modifying at least one characteristic of the first partition to cause the at least a portion of the first partition to operate under the same cell-level format as the second partition comprises converting the at least a portion of the first partition from operating under a triple-level cell format to operating under a single-level cell format.

14. The non-transitory computer readable storage medium of claim 8, wherein:
the first threshold is based on a total capacity of the write cache,
the second threshold is based on a total capacity of the first partition, and
the third threshold is based on a total capacity of the second partition.

15. A computing device configured to balance write commands directed to a non-volatile memory that includes first and second partitions, the computing device comprising:
at least one processor; and
at least one memory storing instructions that, when executed by the at least one processor, cause the computing device to carry out steps that include:
caching write commands into a write cache of the computing device;
in response to determining that an available capacity of the write cache satisfies a first threshold:
directing at least one write command to the first partition in response to determining that an available capacity of the first partition satisfies a second threshold, and
directing at least one write command to the second partition in response to determining that the available capacity of the first partition does not satisfy the second threshold;
in response to determining that an available capacity of the second partition satisfies a third threshold:
directing at least one write command to the second partition in response to determining that the available capacity of the write cache satisfies the first threshold, and modifying at least one characteristic of the first partition to cause at least a portion of the first partition to operate under a same cell-level format as the second partition in response to determining that the available capacity of the write cache does not satisfy the first threshold, and directing at least one write command to the at least a portion of the first partition; and
updating the available capacity of the first or second partition to reflect the at least one write command.

16. The computing device of claim 15, wherein:
the first partition of the non-volatile memory operates under a triple-level cell format; and
the second partition of the non-volatile memory operates under a single-level cell format.

17. The computing device of claim 15, wherein:
the available capacity of the write cache satisfies the first threshold when the available capacity of the write cache is greater than or equal to the first threshold;
the available capacity of first partition satisfies the second threshold when the available capacity of the first partition is greater than or equal to the second threshold; and
the available capacity of the second partition satisfies the third threshold when the available capacity of the second partition is less than the third threshold.

18. The computing device of claim 15, wherein the steps further include:
in response to determining that the available capacity of the write cache does not satisfy the first threshold:
directing at least one write command to the first partition in response to determining that the available capacity of the second partition satisfies the third threshold.

19. The computing device of claim 15, wherein the steps further include:
in response to determining that the available capacity of the second partition does not satisfy the third threshold:
directing at least one write command to the second partition.

20. The computing device of claim 15, wherein modifying at least one characteristic of the first partition to cause the at least a portion of the first partition to operate under the same cell-level format as the second partition comprises converting the at least a portion of the first partition from operating under a triple-level cell format to operating under a single-level cell format.

* * * * *